United States Patent
Wax et al.

[11] Patent Number: 6,084,546
[45] Date of Patent: Jul. 4, 2000

[54] LOCATION DETERMINATION IN WIRELESS COMMUNICATION SYSTEMS USING VELOCITY INFORMATION

[75] Inventors: Mati Wax, San Ramon; Sriram Jayaraman, San Bruno; Oliver Hilsenrath, Alamo, all of Calif.

[73] Assignee: US Wireless Corporation, San Ramon, Calif.

[21] Appl. No.: 09/205,557

[22] Filed: Dec. 4, 1998

Related U.S. Application Data

[63] Continuation-in-part of application No. 08/780,565, Jan. 8, 1997, Pat. No. 6,026,304.
[51] Int. Cl.$^7$ ................................. G01S 3/16; G01S 3/02
[52] U.S. Cl. ......................... 342/378; 342/451; 342/453
[58] Field of Search ..................................... 342/378, 457, 342/453, 451, 450, 461

[56] References Cited

U.S. PATENT DOCUMENTS

| | | | |
|---|---|---|---|
| 5,327,144 | 7/1994 | Stilp et al. | 342/387 |
| 5,512,908 | 4/1996 | Herrick | 342/387 |
| 5,570,412 | 10/1996 | LeBlanc | 379/58 |

OTHER PUBLICATIONS

Hashemi, H. "Pulse Ranging Radiolocation Technique and Its Application to Channel Assignment in Digital Cellular Radio", IEEE Vehicular Technology Conference, May 1991, pp. 675–680.

Jeng, S. S, et al, "Measurements of Spatial Signatures of an Antenna Aray", 6th International Symposium on Personal, Indoor and Mobile Radio Communications, PIMRC '95. pp. 669–672.

*Primary Examiner*—Gregory C. Issing
*Attorney, Agent, or Firm*—Lumen Intellectual Property Services

[57] ABSTRACT

A method for improving the accuracy of signal signature determinations in wireless location finding systems advantageously uses transmitter velocity estimates to accurately and reliably determine in real time a present signal covariance matrix for a transmitter. In a preferred embodiment of the invention, a method for determining a likely location of a transmitter in a wireless transmitter location finding system comprises coherently measuring transmitter signals received at an antenna array, and calculating a current signal covariance matrix from the measured transmitter signals. The method further comprises calculating an average covariance matrix by forming a linear combination of the current signal covariance matrix with past average covariance matrices. The coefficients of the linear combination are selected such that the average covariance matrix is derived primarily from covariance matrices measured over a range of recent transmitter locations within a predetermined distance D from the present location. This distance D preferably corresponds to a spatial span of calibrated signatures. In a preferred embodiment, this condition is satisfied by selecting the coefficients in dependence upon the distance D and an estimated current velocity of the transmitter. The method also includes determining a likely current transmitter location by measuring a similarity between the average covariance matrix and a set of calibrated covariance matrices corresponding to calibrated transmitter locations.

10 Claims, 6 Drawing Sheets

LOCATION DETERMINATION IN WIRELESS COMMUNICATION SYSTEMS USING VELOCITY INFORMATION

This application is a continuation-in-part of U.S. patent application Ser. No. 08/780,565, now U.S. Pat. No. 6,026,304, filed Jan. 08, 1997, which is incorporated herein by reference.

FIELD OF THE INVENTION

This invention relates generally to methods for passively determining the location of a radio transmitter. More particularly, it relates to methods for using transmitter velocity information in the determination of cellular telephone locations.

BACKGROUND OF THE INVENTION

In wireless radio communication systems, such as cellular telephone networks, it is generally recognized that there is a great need and utility for accurately determining in real time the location of mobile radio transmitters, such as cellular phone handsets. For example, U.S. Pat. No. 5,512,908 to Herrick mentions the application of cellular location information to 911 dispatching, tracking unauthorized cell phone usage, and tracking or locating commercial and/or government vehicles. U.S. Pat. No. 5,327,144 to Stilp et al. also mentions various applications of mobile location information, such as locating lost or stolen vehicles, assisting lost motorists, and dispatching emergency vehicles.

All of the above location-based services, however, fundamentally depend on the ability to obtain consistent and accurate location information in a wide range of environments. Although conventional techniques for location finding can provide location information in certain limited situations, they fail to provide accurate location information in many environments, particularly in urban environments where signal multipath is often severe. Urban environments, however, are the places where such services are often needed most.

For example, in U.S. Pat. No. 5,570,412 LeBlanc discloses a wireless location finding system using a databank of location signatures. These signatures are conventional RF signal parameters derived from signals received at a single antenna, and they have little correlation with location, with the exception of time differential data. This time data, however, is severely degraded in high multipath environments Consequently, the techniques taught by LeBlanc are of limited use in urban environments where multipath is high. In addition the time differential data can be measured only by multiple base stations. This requires expensive and precise communication and synchronization between multiple base stations, and also limits the utility of the technique to the rare situations where the transmitter is in simultaneous range of multiple base stations.

In contrast to conventional techniques for location finding, Hilsenrath et al. in U.S. patent application Ser. No. 08/780,565 (which is not admitted to be prior art by its mention in this background discussion) disclose a unique method for location finding that performs especially well in multipath environments, and requires only a single base station. While conventional wisdom views multipath signals as noise to be reduced, ignored, or eliminated, the method of Hilsenrath et al. takes advantage of multipath signals to help identify transmitter locations. Because signal signatures are naturally associated with locations by virtue of the spatial dependence of multipath, the base station can use this fact to determine a location by matching a measured signature with a particular calibrated signature in a database of signatures and corresponding locations.

Due to noise, variable transmitter movement, noise, and other error sources, it can be difficult to consistently obtain accurate and reliable signal signature measurements. There is a need, therefore, to provide techniques for improving the reliability and accuracy of signal signature measurements in these location finding systems.

SUMMARY OF THE INVENTION

Accordingly, it is a primary object of the present invention to provide a method for improving the accuracy of signal signature determinations in wireless location finding systems. In particular, it is an object of the present invention to provide a method for accurately and reliably determining in real time a present signal covariance matrix for a transmitter based on prior signal covariance matrices. It is a further object of the present invention to provide a technique that advantageously uses transmitter velocity measurements for determining in real time a present signal covariance matrix.

In one aspect of the present invention, a method is provided for determining a likely location of a transmitter in a wireless transmitter location finding system. The method comprises coherently measuring transmitter signals received at an antenna array, and calculating a current signal covariance matrix from the measured transmitter signals. The method further comprises calculating an average covariance matrix by forming a linear combination of the current signal covariance matrix with past covariance matrices. The coefficients of the linear combination are selected such that the average covariance matrix is derived primarily from covariance matrices measured over a range of recent transmitter locations within a predetermined distance D from the present location. This distance D preferably corresponds to a spatial span of calibrated signatures. In a preferred embodiment, this condition is satisfied by selecting the coefficients in dependence upon the distance D and an estimated current velocity of the transmitter. A low estimated velocity results in a majority contribution from past covariance matrices collected over the distance D and little contribution from the current covariance matrix. A large estimated current velocity, on the other hand, results in a majority contribution from the current signal covariance matrix and little or no contribution from the past covariance matrices. The method also includes determining a likely current transmitter location by measuring a similarity between the average covariance matrix and a set of calibrated covariance matrices corresponding to calibrated transmitter locations.

DETAILED DESCRIPTION

Although the present detailed description contains many specifics for the purposes of illustration, anyone of ordinary skill in the art will appreciate that many variations and alterations to the details are within the scope of the invention. Accordingly, the following embodiments of the invention are set forth without any loss of generality to, and without imposing limitations upon, the claimed invention.

Figure 1:
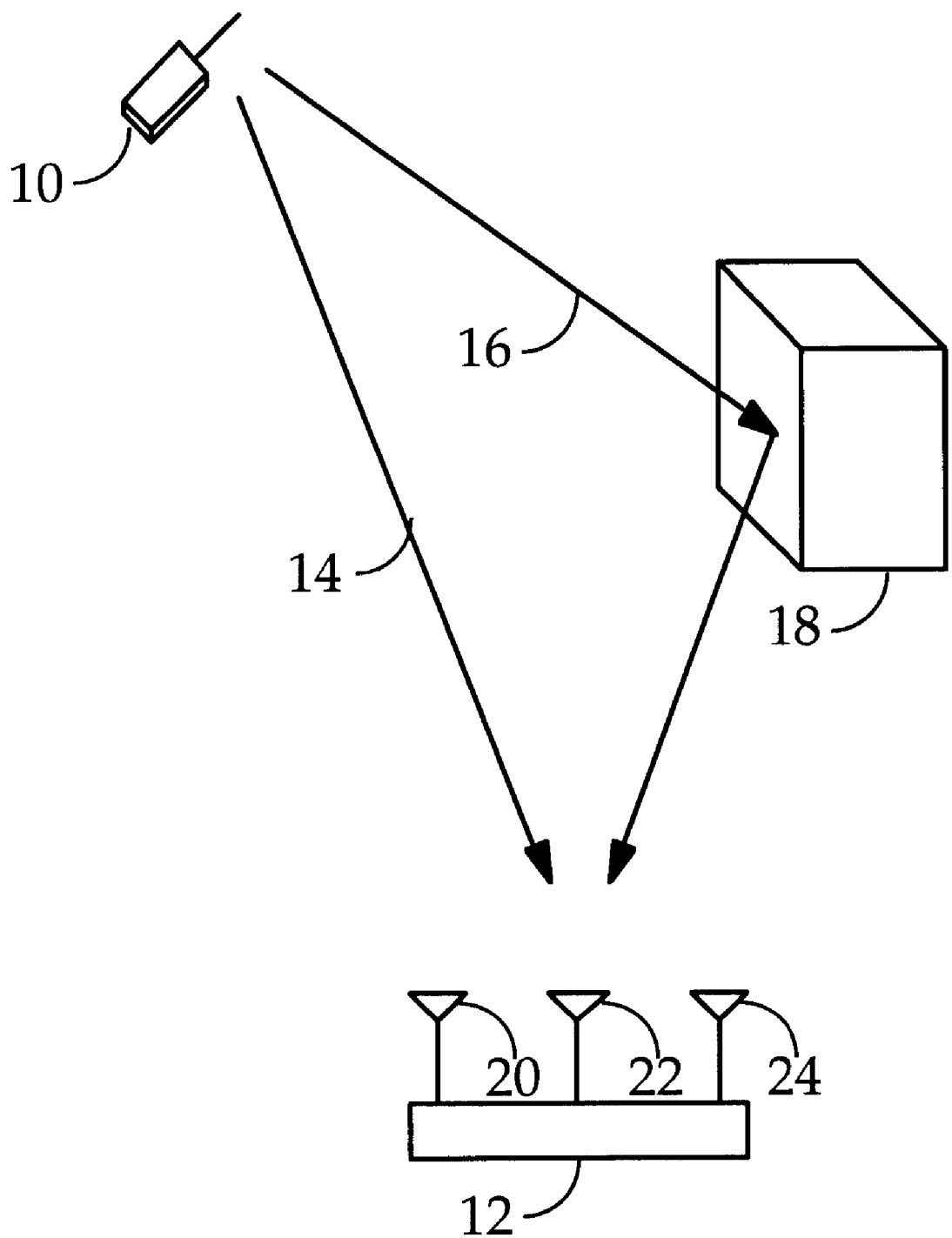
FIG. 1 illustrates a wireless communication system according to the present invention.

In a communication system according to a preferred embodiment of the invention, a cellular telephone 10 transmits a signal which travels through an environment and couples to an array of antennas 20, 22, 24 of a cellular telephone location finding apparatus 12, as shown in FIG. 1. Typically, in addition to a direct path signal 14 from phone 10 to apparatus 12, there may be additional multipath signals reflected from various environmental objects, for example, multipath signal 16 reflected from object 18. In addition, there are typically various smaller local scatterers (not shown) positioned within a region around phone 10. Consequently, signals 14 and 16 may comprise components corresponding to these scattered signals.

Figure 2:
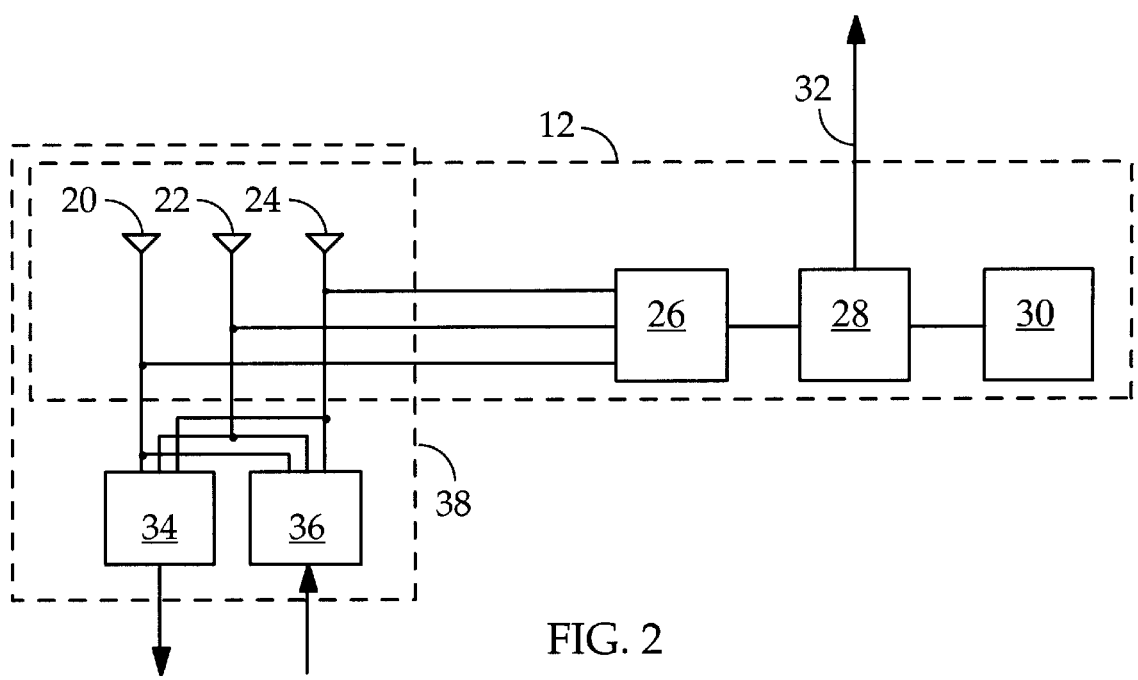
FIG. 2 is a block diagram of an apparatus of the present invention in combination with an existing cellular base station.

As shown in FIG. 2, a location finding apparatus 12 includes a conventional multichannel receiver 26 which coherently receives signals from the antennas 20, 22, 24. The coherently received signals are sent to multi-purpose signal processor 28 which performs signal signature identification, database searching, and other required processing as will be described in detail below. A memory device 30 is accessible by processor 28 and is used to store signal signature calibration data, location data, geographical map data, and/or other data as required. Location information determined by processor 28 is sent over external communication lines 32 for use by other systems, as will be described in more detail below in relation to FIG. 6. In the present embodiment, location finding apparatus 12 shares antennas with an existing cellular telephone base station 38, which has multi-channel receivers 34 and multi-channel transmitters 36, among other components well-known in the art (not shown). Note, however, that location finding apparatus 12 need not be connected to a cellular base station 38, but can operate as a stand-alone device with its own antennas.

In general, the apparatus 12 has a number p of antennas forming an array. For illustrative purposes, however, the array is shown in the figures as having three antennas 20, 22, and 24. In the preferred embodiment, which corresponds to most typical situations, p=6. The p antennas are used to coherently receive complex signal envelopes $x_1(t)$, $x_2(t)$, ..., $x_p(t)$, respectively, which are conventionally grouped together to form a p-dimensional array vector $x(t)=[x_1(t), x_2(t), \ldots, x_p(t)]^T$. In general, the dimension of the array vector $x(t)$ is equal to p, the number of antennas in the array.

In a preferred embodiment, a batch of array vectors is sampled during a sampling time interval, and the outer products of these vectors are combined to form a p×p covariance matrix for the batch. Typically, about 100 array vectors are sampled in a 1 ms sampling interval (one array vector per ten microseconds), as shown in FIG. 3A.

Because each batch spans 1 ms, there is sufficient time using this technique to sample up to 50 different channels in a 50 ms interval. Consequently, although the present description is focused upon the processing of signals from one transmitter on one channel, in the preferred embodiment, the techniques described herein can be applied to signals on up to 50 channels. In addition, it will be recognized by those skilled in the art that although this sampling procedure is appropriate for the AMPS cellular standard it can be adapted to various other modulation schemes as well. In the case of a CDMA cellular network, for example, spread spectrum signals from the antenna array are digitized and passed through synchronized multichannel despreaders to produce the p-dimensional array vectors x(t) corresponding to each mobile. These vectors can then be sampled and used to form a covariance matrix for each batch in the manner outlined above.

Figure 3A:
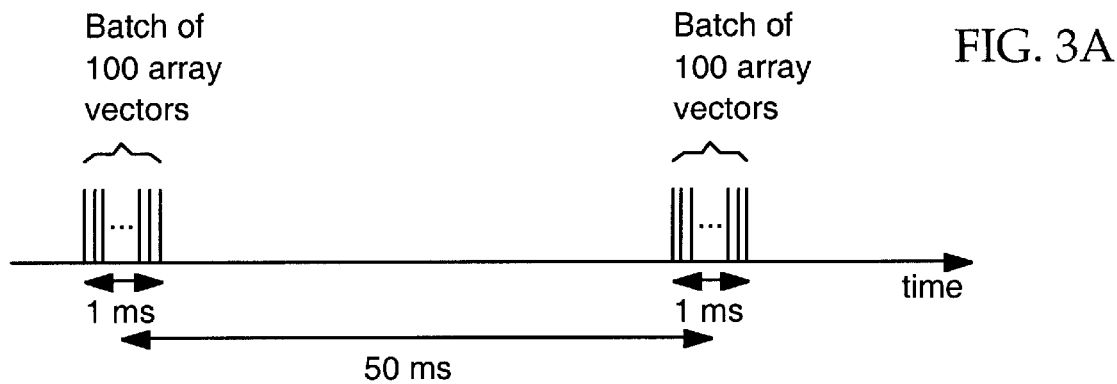
FIGS. 3A–3C are schematic diagrams illustrating a technique for calculating signal covariance matrices according to a preferred embodiment of the present invention.
Figure 3B:
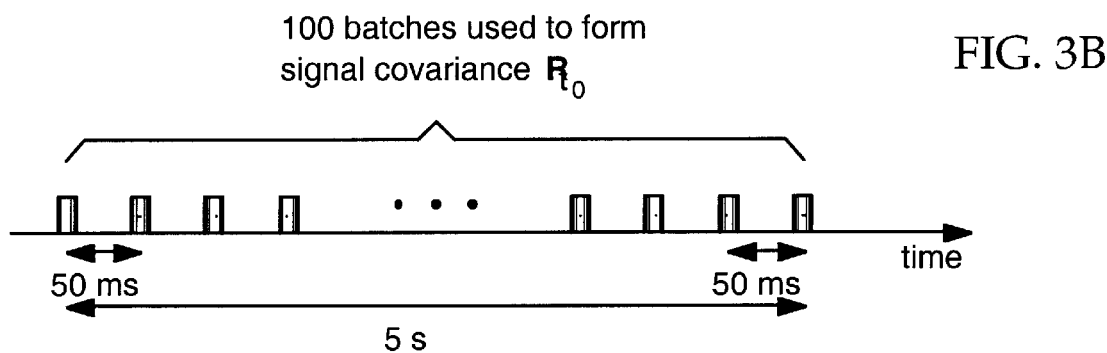
Figure 3C:
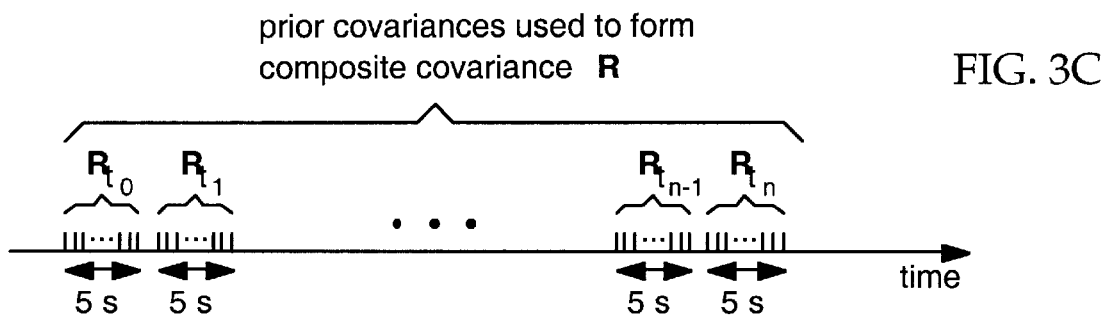

For a given mobile, the covariance matrices for approximately 100 batches are averaged to form a p×p signal covariance matrix, $R_{t_0}$, for the time $t_0$, as shown in FIG. 3A. The covariance matrix is normalized such that Tr $R_{t_0}$=1. As the system continues to operate in real time, another signal covariance matrix $R_{t_1}$ is determined from the signals measured between time $t_0$ and a subsequent time $t_1$. In this manner, a sequence of signal covariance matrices $R_{t_0}$, $R_{t_1}$, $R_{t_2}$, ..., $R_{t_n}$ is generated, where $R_{t_n}$ is the most recent covariance matrix, as shown in FIG. 3C. Typically, the difference $\Delta t_i = |t_i - t_{i+1}|$ is on the order of a few seconds.

In accordance with the teaching of the present invention, an average covariance $\overline{R}_{t_n}$ is produced in real time by forming a linear combination of the covariance matrices $R_{t_0}$, $R_{t_1}$, $R_{t_2}$, ..., $R_{t_n}$. In the preferred embodiment, the specific manner in which the covariance matrices are combined to produce the average covariance matrix depends on estimates of the transmitter velocity, represented by $V_{t_0}$, ..., $V_{t_n}$. Preferably, the covariance matrices combined to form the average covariance matrix are those collected over a time interval in which the transmitter has moved a distance D, where D is a predetermined distance corresponding to the average spatial span between the calibrated signature locations. Generally, if the velocity estimate is large, then the matrices are combined such that the most recent covariance matrices contribute significantly to the average covariance, while the less recent covariance matrices contribute relatively little to the average covariance matrix. Conversely, if the velocity estimate is small, then the contribution of the less recent covariance matrices is not so small. The velocity estimates can be determined using any of various techniques known in the art. For example, $V_{t_0}$ can be estimated based on recent location estimates, or directly from recent covariance matrices. For the purposes of this description, we assume velocity estimates are positive velocity magnitudes.

In one implementation of the preferred embodiment, an average covariance matrix $\overline{R}_{t_n}$ is calculated by evaluating $$\overline{R}_{t_n} = (1/D_m) \sum_{i=m}^{n} v_{t_i} \Delta t_i R_{t_i}$$

-continued $$= (v_{t_m} \Delta t_m R_{t_m} + \ldots + v_{t_n} \Delta t_n R_{t_n})/D_m,$$

where $D_m = V_{t_m} \Delta t_m + \ldots + V_{t_n} \Delta t_n$ and m is selected such that $D_m \approx D$. In other words, m is selected so that the past covariance matrices $R_{t_m}, \ldots, R_{t_n}$ are those collected over a time interval in which the transmitter has moved a distance D. It will be noted that, assuming the time intervals $\Delta t_m, \ldots, \Delta t_n$ are constant, the coefficients that determine the relative weights of the past covariance matrices are proportional to the estimated transmitter velocities. A covariance matrix corresponding to a small velocity will therefore contribute less to the average covariance matrix than a covariance matrix corresponding to a large velocity. In accordance with this general principle, those skilled in the art will be able to construct many other formulas for calculating the average covariance matrix from past covariance matrices.

In another implementation of the preferred embodiment, the average covariance matrix is calculated from the most recent past covariance matrix and velocity estimate and the last average covariance matrix. In other words, $\overline{R}_{t_{n1}}$ is calculated by evaluating $$\overline{R}_{t_n} = f(V_{t_n}, R_{t_n}, \overline{R}_{t_{n-1}}),$$

where f is a function of the current estimated velocity of the transmitter $V_{t_n}$, the current covariance matrix $R_{t_n}$, and the most recent prior average covariance matrix $\overline{R}_{t_{n-1}}$. This is a recursive definition since the covariance matrix $\overline{R}_{t_{n-1}}$ is similarly calculated from $$\overline{R}_{t_{n-1}} = f(V_{t_{n-1}}, R_{t_{n-1}}, \overline{R}_{t_{n-2}}).$$

Thus, one may write $$\overline{R}_{t_n} = f(V_{t_n}, R_{t_n}, f(V_{t_{n-1}}, R_{t_{n-1}}, \ldots f(V_{t_1}, R_{t_1}, f(V_{t_0}, R_{t_0}, R_{t_0})) \ldots )),$$

where $V_{t_0}, \ldots, V_{t_n}$ are the estimated velocities at times $t_0, \ldots, t_n$. Although many possible functions f may be selected for use, in one implementation the function f is defined by forming the following linear combination of $\overline{R}_{t_{n-1}}$ and $R_{t_n}$:

$$\overline{R}_{t_n} = f(V_{t_n}, R_{t_n}, \overline{R}_{t_{n-1}}) = \lambda_{t_n} \overline{R}_{t_{n-1}} + (1 - \lambda_{t_n}) R_{t_n},$$

where $\lambda_{t_n}$ is a velocity-dependent coefficient that takes values between 0 and 1. Values of $\lambda_{t_n}$ near 1 result in large retention of past covariance information, while values of $\lambda_{t_n}$ near 0 result in large forgetting of past covariance information.

In one implementation of the present invention, the values for $\lambda_{t_0}, \ldots, \lambda_{t_n}$ are calculated from time-dependent velocity estimates $V_{t_0}, \ldots, V_{t_n}$. The value of $\lambda_{t_n}$ is calculated such that a very large velocity estimate $v_{t_n}$ results in a value of $\lambda_{t_n}$ near 0, and hence large forgetting of past covariance information, while small velocity estimates result in values of $\lambda_{t_n}$ near or equal to 1, and hence large or total retention of past covariance information. Although many formulas have these properties, one example of a formula for calculating $\lambda_{t_n}$ is the following:

$$\lambda_{t_n} = e^{-v_{t_n} \Delta t_n / D},$$

where $\Delta t_n$ is on the order of a few seconds, D is on the order of a few tens of meters, and $v_{t_n}$ is the current estimate of the transmitter velocity. For example, in the case where $\lambda t_n = 1$ s and D=25 m, a velocity of $V_{t_n}=0$ will result in $\lambda_{t_n}=1$. A velocity of $V_{t_n}=25$ m/s (i.e., 55 mph), on the other hand, will result in $\lambda_{t_n}=e^{-1}=0.368$. It will be appreciated that many other equations for $\lambda_{t_n}$ may be used to produce substantially equivalent effects. For example, $$\lambda_{t_n} = 1/(1 + V_{t_n})$$

or $$\lambda_{t_n} = 1/(1 + (V_{t_n})^2).$$

In an alternate embodiment, the value for $\lambda_{t_n}$ is selected from a finite set of predetermined values $\lambda_1, \ldots, \lambda_m$. The particular value selected depends on the value of $V_{t_n}$. For example, $$\lambda_{t_n} = \begin{cases} 1 & \text{if } v_{t_n} < T \\ 0 & \text{if } v_{t_n} > S \\ .5 & \text{otherwise,} \end{cases}$$

where T and S are predetermined low-velocity and high-velocity thresholds.

This technique for calculating an average covariance matrix from past covariance matrices has important advantages. Because the current covariance matrix of a very slowly moving or stationary transmitter has less information than that of a moving transmitter, it correlates weakly with location and introduces ambiguity into the location finding process. The present technique, however, retains past covariance information when the velocity is small or zero, and overcomes this problem. When the transmitter is moving quickly, on the other hand, the current covariance matrix correlates strongly with the current location, while the past covariance matrices correlate strongly with past locations. Because the present technique forgets past covariance information in this case, it provides an automatic and adaptive way to generate an average covariance matrix that is most highly correlated with the current location.

In one technique for location finding using velocity information, the location of a mobile is determined through the use of a database containing N calibrated signal signatures and associated locations, as shown in TABLE 1.

TABLE 1

| Location | Signal Signature | | |
|---|---|---|---|
| (x, y, z) | Subspace | Time Delays | Covariance |
| $d_1$ | $U_1$ | $\tau_1$ | $R_1$ |
| . | . | . | . |
| . | . | . | . |
| . | . | . | . |
| $d_N$ | $U_N$ | $\tau_N$ | $R_N$ |

The locations $d_1, \ldots, d_N$ may be two or three dimensional, and each may be assigned a date upon which it was last calibrated. Each location $d_i$ has an associated signal signature that characterizes the structure of the signal from that location. This signal signature may include information such as a signal subspace $U_i$, a set of differential time delays $\tau_i$, and a calibrated covariance matrix $R_i$.

This database may be generated by various techniques. For example, it may be generated by an empirical calibration procedure, as follows. A cellular phone and a global positioning system (GPS) receiver are placed in a vehicle which moves to various locations in a geographical region of interest. The GPS data are periodically stored and time-stamped using the GPS clock. Meanwhile, the transmitted signal from the cellular phone is received at the base station, which is also equipped with a GPS receiver, and the signal covariance matrix R is also time stamped with the GPS clock and stored. When the mobile returns, the stored data is post-processed using differential GPS correction data obtained from the base station to determine with high accuracy the location corresponding to each covariance matrix R. This data is then used to construct the calibration table database.

The signal subspace $U_i$ for a location is determined from the dominant eigenvectors of $R_i$. The dominant eigenvectors are defined as the eigenvectors of $R_i$ corresponding to the largest eigenvalues that collectively capture at least certain amount, e.g. 90%, of the total signal energy. It should be emphasized that the signal subspace may be determined by various different criteria as well.

In one approach to location finding, the location of a mobile phone in the service area may be determined in real time as follows. Signals originating from a phone 10 at an unknown location are received at the base station 12 by multichannel receiver 26. The signal processor 28 at the base station then generates a signal covariance matrix $R_{t_n}$ and computes a new average covariance matrix $\overline{R}_{t_n}$ as described above. For simplicity of notation in what follows we use R to denote $\overline{R}_{t_n}$.

The average covariance matrix $R = \overline{R}_{t_n}$ is then compared with the set of N calibrated signal subspaces $\mathcal{U} = \{U_1, \ldots, U_N\}$ which are stored along with the associated set of N known locations $\mathcal{D} = \{d_1, \ldots, d_N\}$ in the calibration database. A measure of similarity between average covariance matrix R and a given calibrated signature $U_i$ is used to determine the extent to which the current covariance matrix corresponds to each calibrated signal subspace. In the preferred embodiment, this measure of similarity is determined by evaluating a function that measures the degree to which the measured signal covariance R coincides with the $i^{th}$ calibrated subspace $U_i$. For example, define the function $L_R$ at a location index i to be the weighted mean of the square of the cosines of the principle angles between the subspace $U_i$ and R, where the weights are given by the eigenvalues of R. In other words, $$L_R(i) = \text{Tr}\{P_i R\} = \text{Tr}\{U_i U_i^H R\},$$

where $P_i = U_i U_i^H$ is the projector onto the subspace $U_i$ and $U_i^H$ is the Hermitian conjugate of $U_i$. The value of $L_R(i)$ represents the likelihood that the mobile is at or near calibrated location $d_i$. It will be appreciated that this function can be defined in many other ways to measure how closely the signal covariance resembles any given calibrated signature. For example, $L_R(i)$ can be defined to be the mean of the squares of the cosines of the principal angles between the subspaces U and $U_i$, where U is the subspace corresponding to R. In other words, $$L_R(i) = \frac{1}{m} \|U U^H U_i\|^2,$$

where $m = \min\{\dim U, \dim U_i\}$ and $\|\cdot\|$ is the Frobinius norm defined by $\|A\|^2 = \text{Tr}(AA^H)$. Note that $UU^H$ can be computed just once and the result may be used to evaluate $L_R(i)$ for any i.

Figures 4A, 4B:
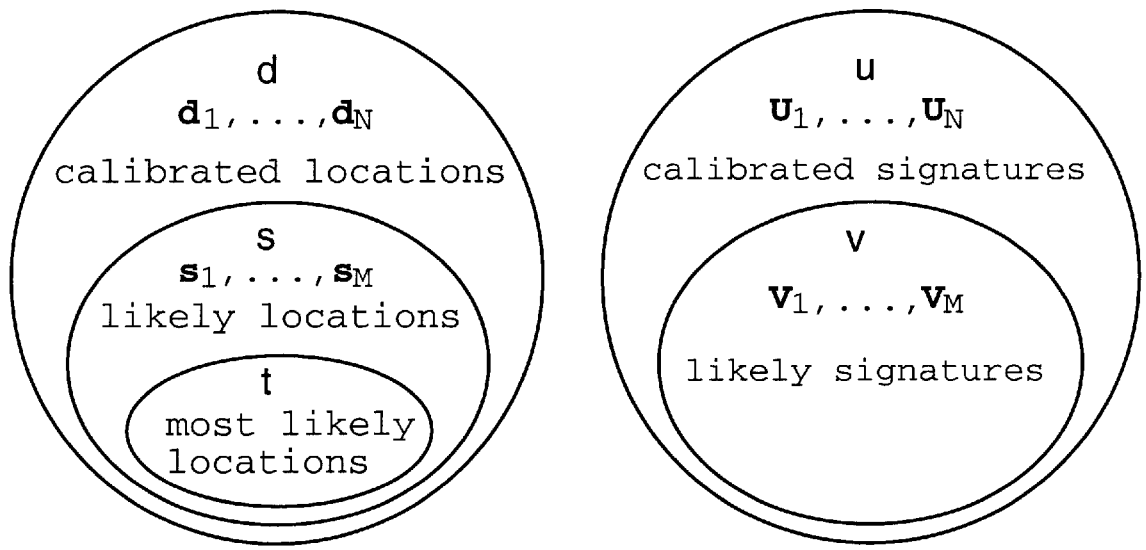
FIG. 4A is a schematic diagram of the relationship between the set $\mathcal{B}$ of calibrated locations, the set $\mathcal{S}$ of likely locations, and the set $\mathcal{T}$ of most likely locations.
FIG. 4B is a schematic diagram of the relationship between the set $\mathcal{U}$ of calibrated signatures and the set $\mathcal{V}$ of likely signatures.
Figure 5A:
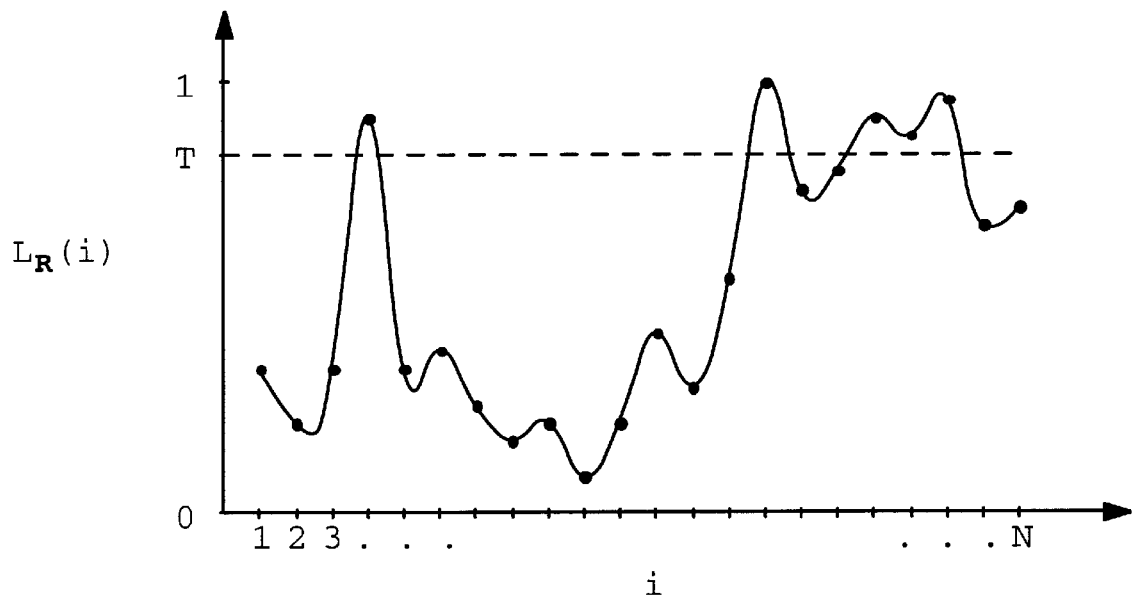
FIG. 5A is a graph of the measure of similarity vs. calibrated signature for a measured signature R.

By calculating the value of $L_R(i)$ for all N locations, a set $\mathcal{S}$ of likely locations can be selected from among the locations in $\mathcal{D}$ by taking, for example, those locations $d_i$ such that $L_R(i)$ is greater than a certain predetermined threshold value T, as shown in FIG. 5A. The actual location of the phone will be one of these likely locations, indicated in the figure as points above the dashed line. Alternatively, the set of likely locations can be selected by taking a predetermined number (e.g., ten) of locations $d_i$ such that $L_R(i)$ is largest. Other similar criteria for selecting likely locations can be used as well. Note that this set $\mathcal{S} = \{s_1, \ldots, s_M\}$ of likely locations corresponds to a set $\mathcal{V} = \{V_1, \ldots, V_M\}$ of likely calibrated signatures. FIGS. 4A and 4B illustrate the relationships between these sets.

Alternatively, or in addition to the above method, other methods of determining likely locations may be used as well. For example, a set of N functions $L_{R_1}(i), \ldots, L_{R_N}(i)$ can be calculated, where $L_{R_j}(i)$ is defined just as $L_R(i)$ was defined above, but with $R_j$ in place of R.

Figure 5B:
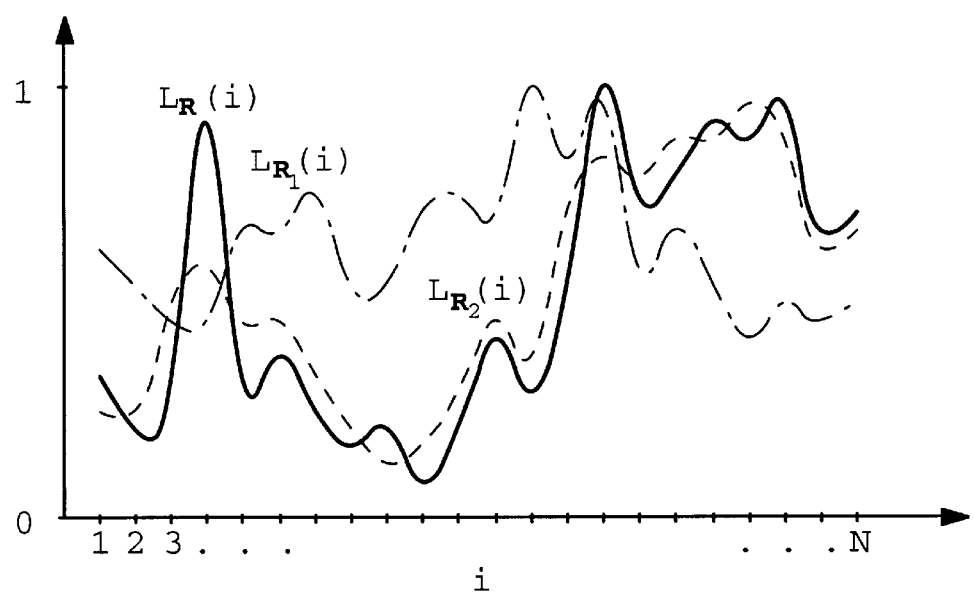
FIG. 5B is a graph of the measure of similarity vs. calibrated signature for a measured signature R, as well as for likely signatures $R_1$ and $R_2$.

FIG. 5B shows graphs of two possible functions $L_{R_1}$ and $L_{R_2}$ (dashed) superimposed on the graph of $L_R$ (solid). Observe that when the function $L_R$ is compared with each of the functions $L_{R_1}, \ldots, L_{R_M}$, the actual location ideally should be that location which corresponds to the function that is closest to $L_R$ in some statistical metric G.

The actual location should be the location $d_k$ for which $G(k)$ is the smallest. Those skilled in the art will appreciate that many measures of statistical similarity between functions can be used to determine the similarity of functions to achieve the same result. For example, let $$G(k) = \sum_{i=1}^{N} |L_R(i) - L_{R_k}(i)|^2.$$

Alternatively, $G(k)$ can be defined by the Kullback-Liebler distance, $$G(k) = \sum_{i=1}^{N} \tilde{L}_R(i) \ln \tilde{L}_R(i) / \tilde{L}_{R_k}(i),$$

where $$\tilde{L}_R(i) = \frac{L_R(i)}{\sum_{j=1}^{N} L_R(j)}$$

and $$\tilde{L}_{R_k}(i) = \frac{L_{R_k}(i)}{\sum_{j=1}^{N} L_{R_k}(j)}.$$

Then a set of most likely locations can be selected by finding those locations $d_k$ such that $G(k)$ is less than a certain predetermined threshold value T'.

The above technique reduces location ambiguity because the function $L_R$ is compared to the functions $L_{R_k}$ over their entire domains rather than just at single points. Thus, more information is used to compare the measured signature with the calibrated signatures, and a more accurate match can be obtained.

This technique may be used to select from the set $\mathcal{S}$ of likely locations a smaller set of most likely locations $\mathcal{T} \subset \mathcal{S}$. (See FIG. 4A.) The set $\mathcal{T}$ can be defined as the locations in $\mathcal{S}$ whose corresponding functions $L_{R_k}$ are closest to $L_R$ in the sense of G. Alternatively, $\mathcal{T}$ can be defined as those locations in $\mathcal{S}$ whose corresponding functions $L_{R_k}$ are within a certain predetermined distance H (in the sense of G) to $L_R$. That is, $$\mathcal{T} = \{s_k \in \mathcal{S} : G(k) < H\}.$$

By appropriate adjustment of the constants T and H in dependence upon the degree of tolerance desired and the amount of noise present in a particular system, the set $\mathcal{T}$ should contain one or more locations that have a high probability of being the actual location of the transmitter.

Figure 6:
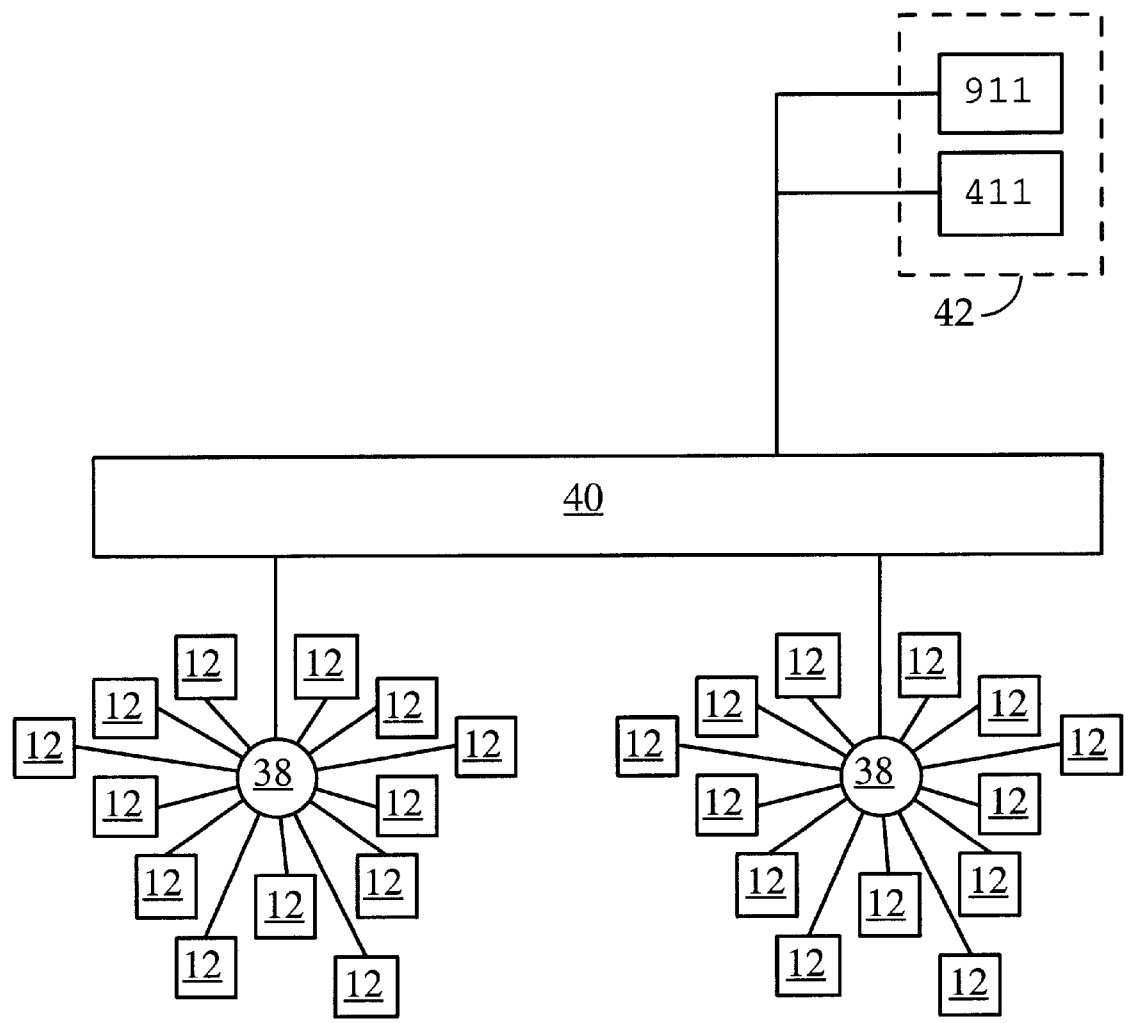
FIG. 6 is a schematic diagram of a cellular network management system according to the present invention.

If the set $\mathcal{T}$ contains more than one location, then additional techniques can be used to further reduce ambiguity. In particular, note that this technique can be used in the situation where information from multiple bases is available to provide additional ambiguity reduction. An example of such a system is shown in FIG. 6. Individual base stations 12 are connected to metropolitan hubs 38, which collect and coordinate location information for cellular phones in different metropolitan areas.

To reduce ambiguity in such a system, signatures R and R' from a single phone are measured at a first and second base station, respectively, and these signatures are sent every few seconds to their common hub 38 where the signatures are compared to calibrated signatures $\mathcal{U} = \{U_1, \ldots, U_N\}$ and $\mathcal{U}' = \{U'_1, \ldots, U'_N\}$ to obtain functions $L_R$ and $L'_R$, from which likely locations $\mathcal{S} = \{s_1, \ldots, s_M\}$ and $\mathcal{S}'32$ $\{s'_1, \ldots, s'_M\}$ are determined, just as before. These likely locations are determined independently.... Then, rather than determining subsets $\mathcal{T}$ and $\mathcal{T}'$ independently, the likely signature information from both base stations is combined to provide additional ambiguity reduction, as follows.

Figure 4C:
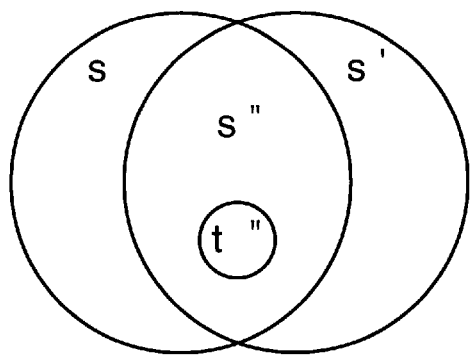
FIG. 4C is a schematic diagram of the relationship between the sets 𝛿 and 𝛿' of likely locations determined from two different base stations, the set 𝛿" of their likely common locations, and a subset 𝛿'" of most likely common locations.

Because the actual location must be common to both base stations, we need only consider the set $\mathcal{S}'' = \{s''_1, \ldots, s''_K\}$ of those locations common to both $\mathcal{S}$ and $\mathcal{S}'$, i.e. let $\mathcal{S}'' = \mathcal{S} \cap \mathcal{S}'$. If there is more than one location in $\mathcal{S}''$ then we can select from the set $\mathcal{S}''$ of likely common locations a smaller set of most likely common locations $\mathcal{T} \subset \mathcal{S}''$. (See FIG. 4C.) The set $\mathcal{T}''$ can be defined in various ways, such as $$\mathcal{T}'' = \{s''_k \in \mathcal{S}'' : G(k) + G'(k) < g\},$$

where g is a predetermined constant, and G' (k) is defined just as G(k), except with reference to $\mathcal{U}' = \{U'_1, \ldots, U'_N\}$, rather than to $\mathcal{U} = \{U_1, \ldots, U_N\}$. It will be appreciated that various alternate criteria can be used to define the set of most likely locations by making use of the functions G and G'. Because this technique simultaneously compares the function $L_R$ to both the calibrated functions $L_{R_k}$ and $L_{R'_k}$, it provides a higher degree of ambiguity reduction than the technique of comparing $L_R$ to each of $L_{R_k}$ and $L_{R'_k}$ independently. It will be appreciated by those skilled in the art that this technique generalizes in a straightforward way to three or more base stations.

The accurate and reliable location information provided by the present invention can be used for many important applications. For example, location information can be sent by the cellular operator to third party service providers 42 for various uses. For example, it can be used in conjunction with 911 calls to provide dispatchers with immediate locations for callers under emergency circumstances. Location information also can be used for enhanced 411 service, i.e. for real time caller location associated services, such as providing directions to lost motorists. The location information can be sent to an automatic road toll management system or used for smart vehicular scheduling on a highway network. For example, the present invention may be used to provide enhanced 911 response of emergency vehicles by tracking the locations of emergency vehicles, coordinating location information with street map databases, and communicating specific optimal directions to appropriate vehicles. Such an enhanced 911 service is an important advantage of the present invention. Location information also can be used for remote monitoring of health conditions of patients, for remote control and/or navigation of robot devices, and for numerous other such special purpose applications.

The foregoing important applications, as well as many others, can be integrated into a wireless arena management (WAM) system, shown in FIG. 6, which makes use of location information determined by individual base stations 12 and/or hubs 38 to manage metro networks individually and collectively. For example, location information sent from individual base station sites 12 to metro hubs 38 can be used to assist in hand-off between cells, for automatic trunking, for channel borrowing, for channel capacity optimization, to more efficiently allocate cellular frequencies, and to increase the capacity of the metro network. On a global level, a WAM hub 40 links the metro hubs 38 and provide access to third party service centers 42, for example, appropriate regional 911 and 411 service centers. It is a significant feature of the present invention that high bandwidth communication lines are not required to determine and communicate location information within such a network. Accordingly, the present invention enables for the first time the ability to use location information to actively monitor and/or manage all the wireless traffic in a network.

It should be noted that the present technique is applicable to other techniques for matching a measured value to a collection of possible values. For example, the present technique is easily adapted for use in reducing ambiguity in direction finding (DF) based techniques for location determination. It may also be adapted to various other analogous pattern recognition problems. In addition, it should be noted that the foregoing details may be varied in many ways without departing from the general spirit and scope of the invention. Accordingly, the scope of the present invention should be determined from the following claims and their legal equivalents.

What is claimed is:

1. In a system for wireless transmitter location finding, a method for determining a likely location of a transmitter, the method comprising:

coherently measuring transmitter signals received at an antenna array;

calculating a current signal covariance matrix from the coherently measured transmitter signals;

calculating an average covariance matrix by forming a linear combination of the current signal covariance matrix with past covariance matrices, wherein coefficients of the linear combination depend on an estimated current velocity of the transmitter; and determining a likely current transmitter location by measuring a similarity between the average covariance matrix and a set of calibrated covariance matrices corresponding to calibrated transmitter locations.

2. The method of claim 1 wherein the average covariance matrix is calculated such that a zero estimated velocity corresponds to a majority contribution of the past average covariance matrices to the average covariance matrix, while a large estimated current velocity corresponds to a majority contribution of the current signal covariance matrix to the average covariance matrix.

3. The method of claim 1 wherein the average covariance matrix is calculated such that the average covariance matrix is derived primarily from covariance matrices measured over a range of recent transmitter locations within a predetermined distance D from a present location, where D corresponds to a spatial span between calibrated signature locations.

4. The method of claim 3 wherein the average covariance matrix $\overline{R}_{t_n}$ is calculated from past covariance matrices $R_{t_m}, \ldots, R_{t_n}$ by evaluating an equation substantially equivalent to $$\overline{R}_{t_n} = (1/D_m)\sum_{i=m}^{n} v_{t_i}\Delta t_i R_{t_i}$$

where $D_m = v_{t_m}\Delta t_m + \ldots + v_{t_n}\Delta t_n$, and where m is selected such that $D_m$ is approximately equal to D.

5. The method of claim 1 wherein the average covariance matrix $\overline{R}_{t_n}$ is calculated by evaluating an equation substantially equivalent to $$\overline{R}_{t_n} = \lambda_{t_n}\overline{R}_{t_{n-1}} + (1-\lambda_{t_n}) R_{t_n},$$

where $\overline{R}_{t_{n-1}}$ is a prior average covariance matrix, and where $\lambda_{t_n}$ is a coefficient selected in dependence upon the estimated current velocity of the transmitter.

6. An apparatus for wireless transmitter location finding comprising:
a multichannel receiver for coherently measuring signals received at an antenna array from a transmitter; and
a signal processor in electrical communication with the multichannel receiver for estimating a location of the transmitter, wherein the signal processor:
calculates a current signal covariance matrix from the coherently measured transmitter signals;
calculates an average covariance matrix by forming a linear combination of the current signal covariance matrix with past covariance matrices, wherein coefficients of the linear combination depend on an estimated current velocity of the transmitter; and
determines a likely current transmitter location by measuring a similarity between the average covariance matrix and a set of calibrated covariance matrices corresponding to calibrated transmitter locations.

7. The apparatus of claim 6 wherein the signal processor calculates the average covariance matrix such that a zero estimated velocity corresponds to a majority contribution of the past average covariance matrices to the average covariance matrix, while a large estimated current velocity corresponds to a majority contribution of the current signal covariance matrix to the average covariance matrix.

8. The apparatus of claim 6 wherein the signal processor calculates the average covariance matrix such that the average covariance matrix is derived primarily from covariance matrices measured over a range of recent transmitter locations within a predetermined distance D from a present location, where D corresponds to a spatial span between calibrated signature locations.

9. The apparatus of claim 8 wherein the signal processor calculates the average covariance matrix $\overline{R}_{t_n}$ from past covariance matrices $R_{t_m}, \ldots, R_{t_n}$ by evaluating an equation substantially equivalent to $$\overline{R}_{t_n} = (1/D_m)\sum_{i=m}^{n} v_{t_i}\Delta t_i R_{t_i}$$

where $D_m = v_{t_m}\Delta t_m + \ldots + v_{t_n}\Delta t_n$, and where m is selected such that $D_m$ is approximately equal to D.

10. The apparatus of claim 6 wherein the signal processor calculates the average covariance matrix $\overline{R}_{t_n}$ by evaluating an equation substantially equivalent to $$\overline{R}_{t_n} = \lambda_{t_n}\overline{R}_{t_{n-1}} + (1-\lambda_{t_n}) R_{t_n},$$

where $\overline{R}_{t_{n-1}}$ is a prior average covariance matrix, and where $\lambda_{t_n}$ is a coefficient selected in dependence upon the estimated current velocity of the transmitter.

* * * * *